United States Patent [19]

Tabuchi

[11] 3,918,088

[45] Nov. 4, 1975

[54] POWER SUPPLY CIRCUIT FOR VARYING THE BIAS SIGNAL TO A MAGNETIC HEAD

[75] Inventor: Hideo Tabuchi, Tokyo, Japan

[73] Assignee: Sony Corporation, Tokyo, Japan

[22] Filed: June 3, 1974

[21] Appl. No.: 475,514

[30] Foreign Application Priority Data

June 9, 1973 Japan ............................... 48-68404

[52] U.S. Cl. .................................. 360/66; 331/186
[51] Int. Cl.$^2$ ........................ G11B 5/47; G11B 5/02
[58] Field of Search ............ 360/66, 31, 25, 65, 24, 360/27; 331/185, 186

[56] References Cited

UNITED STATES PATENTS

| | | | |
|---|---|---|---|
| 3,300,590 | 1/1967 | Cronin | 360/66 |
| 3,798,673 | 3/1974 | Koinuma | 360/66 |
| 3,812,529 | 5/1974 | Yoichi | 360/66 |

*Primary Examiner*—Alfred H. Eddleman
*Attorney, Agent, or Firm*—Hill, Gross, Simpson, Van Santen, Steadman, Chiara & Simpson

[57] ABSTRACT

A bias curcuit for a tape recorder is provided where an input voltage of the bias oscillator is changed in accordance with a magnetic tape material.

2 Claims, 3 Drawing Figures

POWER SUPPLY CIRCUIT FOR VARYING THE BIAS SIGNAL TO A MAGNETIC HEAD

DESCRIPTION OF THE PRIOR ART

In the conventional magnetic recording and/or reproducing apparatus such as a tape recorder or VTR, it is known that a constant direct current or a constant alternating current as a bias current is fed into a magnetic recording head together with signals to be recorded so that a magnetic tape can be operated most suitably for recording the signals. An optimum level of the bias current depends on the kind of a used magnetic tape material such as gamma-$Fe_2O_2$ tape or chromium dioxide ($CrO_2$) tape. The bias current deviated from the optimum level will badly affect recording sensitivity, high frequency response, a distortion factor, etc.

For that reason, a bias current adjusting circuit is used in the magnetic recording and/or reproducing apparatus, whereby the bias current can be changed in accordance with the kind of the magnetic tapes so that the magnetic tape can be recorded in the optimum condition, and accordingly the recorded signals can be reproduced therefrom without distortion.

The following bias current adjusting circuits are hitherto known for the tape recorder in which the bias current can be adjusted for the kind of the magnetic tape.

a. A capacitor is connected between the magnetic recording head and the bias oscillator. The bias current for the magnetic recording head can be changed by changing the capacitance of the capacitor. This circuit is used particularly for any high impedance type recording head.

b. A capacitor and a resistor are connected in series between the magnetic recording head and the bias oscillator. The bias current can be changed due to the resistance of the resistor. This circuit is used particularly for any low impedance type recording head.

However, in the above circuits (a) and (b), the capacitor or the resistor is required to be accurate for the bias current, and further it is difficult to adjust the bias current.

SUMMARY OF THE INVENTION

Accordingly, it is an object of this invention to provide a power supply circuit which is simple in arrangement and accurate in operation.

Another object of this invention is to provide a power supply circuit which does not specially require any accurate circuit elements such as accurate capacitors and/or accurate resistors.

A further object of this invention is to provide a power supply circuit by which a supply voltage can be rapidly and easily changed.

The above, and other objects, features and advantages of the invention, will be apparent in the following detailed description of illustrative embodiment thereof which is to be read in connection with the accompanying drawings.

DESCRIPTION OF THE PREFERRED EMBODIMENTS

One prior art of the recording circuit in the tape recorder mentioned in the above item (a) will be described with reference to FIG. 1.

In this prior art, the capacitance of a capacitor connected between a recording head, for instance, a magnetic recording head 1 and a bias oscillator 5 is changed, so that the bias current fed into the recording head 1 is changed. This circuit is used mainly for a high impedance type recording head.

Figure 1:
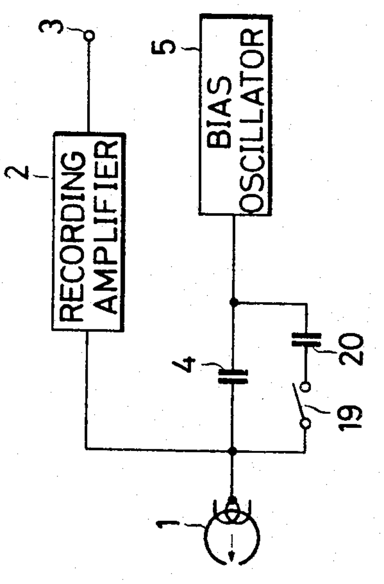
FIG. 1 PRIOR ART
FIG. 1 is a block diagram of one prior art of the recording circuit in the tape recorder.

In FIG. 1, one capacitor 4 is connected between the bias oscillator 5 feeding the bias current and the recording head 1. Another capacitor 20 connected in series with a switch 19 is provided in parallel with the capacitor 4. The capacitor 20 is connected in parallel with the capacitor 4 or is put into the open state, by ON-OFF operation of the switch 19. A signal input terminal 3 is connected to the recording head 1 through a recording amplifier 2.

When the switch 19 is put into the ON-state, the bias current is fed into the recording head 1 from the bias oscillator 5 through the parallel circuit of the capacitors 4 and 20. When the switch 19 is put into the OFF-state, the bias current is fed into the recording head 1 from the bias oscillator 5 only through the capacitor 4. Since the output of the bias oscillator 5 is supplied to the recording head 1 through a larger capacitance in the ON-state of the switch 19 than in the OFF-state of the switch 19, a larger bias current is fed into the recording head 1 in the ON-state of the switch 19. In this way, the bias current fed into the recording head 1 can be changed by the ON-OFF operation of the switch 19. Consequently, two kinds of the magnetic tapes different from each other in optimum bias current can be used in optimum bias current, respectively.

However, the capacitor as a bias current adjustment method or a tape selecting method is required to be highly accurate for adjusting the bias current in this circuit.

Another prior art of the recording circuit in the tape recorder mentioned in the above item (b) will be described with reference to FIG. 2.

In this prior art, the resistance of a resistor 21 connected with a capacitor 4 is adjusted between the recording head 1 and the bias oscillator 5, so that the bias current fed into the recording head 1 is changed. This circuit is used mainly for a low impedance type recording head.

Figure 2:
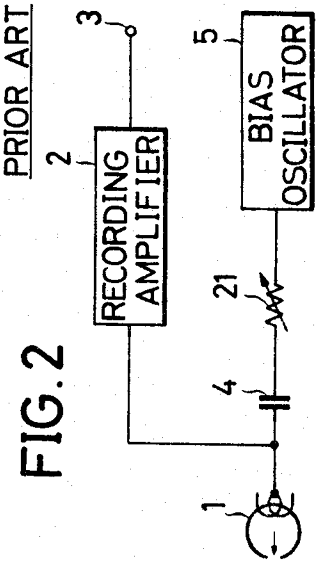
FIG. 2 PRIOR ART
FIG. 2 is a block diagram of another prior art of the recording circuit in the tape recorder.

In this circuit shown in FIG. 2, the bias current decreases with the increase of the resistance of the variable resistor 21. And the bias current increases with the decrease of the resistance thereof. Consequently, two kinds of the magnetic tapes different from each other in optimum bias current can be used in optimum bias current, respectively.

However, the resistor as a bias current adjustment is required to be highly accurate.

Figure 3:
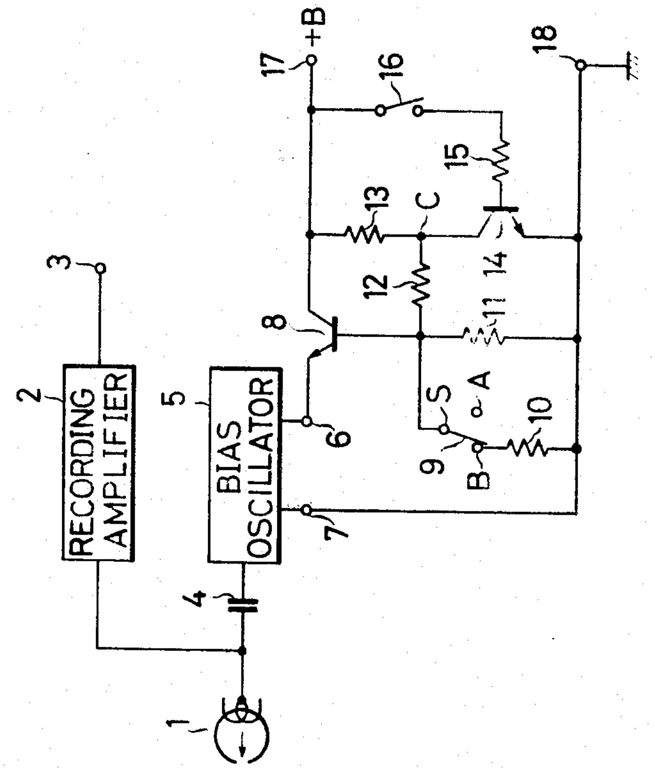
FIG. 3 is a block diagram of one embodiment of a recording circuit provided with a power supply circuit according to this invention.

In FIG. 3, a recording circuit in a tape recorder according to the invention is shown, by which the above-mentioned disadvantages can be removed.

In FIG. 3, the parts which are common with the parts in FIG. 1 and FIG. 2, carry the same numerals. The detailed description of the common parts will be omitted.

Signals to be recorded are applied to the input terminal 3 of the recording amplifier 2 to be amplified to the required level thereby. The output of the recording amplifier 2 and that of the bias oscillator 5 through the capacitor 4 are supplied to the recording head, or the magnetic recording head 1.

A positive input terminal 6 of the bias oscillator 5 is connected to an emitter of a control transistor 8, while a negative input terminal of the bias oscillator 5 is connected to a grounded negative terminal 18 of a power supply.

A change-over contact S of a tape selecting switch 9, a resistor 11 and a resistor 12 are connected to a base of the control transistor 8. One end of a resistor 13, another end of which is connected to one end of the resistor 12, and a positive terminal 17 of the power supply are connected to a collector of the control transistor 8. One end of a resistor 10 is connected to a fixed contact B of the tape selecting switch 9 and another end is connected to ground. Another fixed contact A of the tape selecting switch 9 is open. One end of the resistor 11 is connected to the base of the control transistor 8, while another end of the resistor 11 is connected to the ground potential.

A connecting point C of the resistors 12 and 13 is connected to a collector of a transistor 14 constituting a shunt circuit. A base of the transistor 14 is connected to the positive terminal 17 of the power supply through a resistor 15 and a shunt switch 16. An emitter of the transistor 14 is connected to the ground.

In the recording circuit as above mentioned, the voltage of the power supply supplied between the positive terminal 17 and the negative terminal 18 is applied to the resistor 11 and the change-over contact S of the tape selecting switch S, across the resistors 12 and 13.

When the change-over contact S of the tape selecting switch 9 is connected to the fixed contact B as shown in FIG. 3, the base of the control transistor 8 is connected to ground through the resistance 11, and also through the contact S, the fixed contact B and the resistor 10.

Since the voltage of the power supply is divided by the parallel combined resistance $$\frac{R_1 . R_2}{R_1 + R_2}$$

of the resistors 10 and 11, and the series combined resistance $R_o$ of the resistors 12 and 13, the base potential $Vb_1$ of the control transistor 8 is represented as the followings:

$$Vb_1 \alpha \frac{\frac{R_1 . R_2}{R_1 + R_2}}{R_o + \frac{R_1 . R_2}{R_1 + R_2}}$$

where $R_1$ and $R_2$ are the resistances of the resistors 10 and 11, respectively.

The base potential $Vb_1$ biases the control transistor 8 to control the emitter current thereof. Consequently, the current or the voltage supplied to the positive input terminal 6 of the bias oscillator 5 is controlled in correspondence with the base potential $Vb_1$ of the control transistor 8.

On the other hand, when the change-over contact S of the tape selecting switch 9 is connected to the fixed contact A, the base of the control transistor 8 is grounded only through the resistor 11. Since the voltage of the power supply is devided by the resistance $R_2$ of the resistor 11 and the series combined resistance $R_o$ of the resistors 12 and 13, the base potential $Vb_2$ of the control transistor 8 is represented as the following:

$$Vb_2 \alpha \frac{R_2}{R_o + R_2}$$

The base potential $Vb_2$ biases the control transistor 8 to control the emitter current thereof.

Since the resistance $R_2$ of the resistor 11 is higher than the parallel combined resistance $$\frac{R_1 . R_2}{R_1 + R_2}$$

of the resistors 10 and 11

$$\left(R_2 > \frac{R_1 \cdot R_2}{R_1 + R_2}\right),$$

the base potential $Vb_2$ is higher than the base potential $Vb_1 (Vb_2 > Vb_1)$. Therefore, the emitter current corresponding to the base potential $Vb_2$ is larger than the emitter current corresponding to the base potential $Vb_1$. The input current to the bias oscillator 5 corresponding to the base potential $Vb_2$ is larger than the input current to the bias oscillator 5 corresponding to the base potential $Vb_1$. In other words, the voltage applied to the bias oscillator 5 in correspondence with the base potential $Vb_2$ is higher than the voltage applied to the bias oscillator 5 in correspondence with the base potential $Vb_1$.

When the tape selecting switch 9 is connected to the fixed point A thereof, the higher voltage is applied to the bias oscillator 5 than when the contact S is connected to the fixed point B thereof. Since the output of the bias oscillator 5 increases with the input thereof, a larger bias current is fed into the recording head 1 by the higher voltage to the bias oscillator 5. The bias current fed into the recording head 1 can be changed in such a manner that the change-over contact S of the tape selecting switch 9 is changed to in accordance with the fixed contact A or B.

The signals amplified to the required level by the recording amplifier 2 are fed into the recording head 1. Therefore, a combined current of the bias current with the signal current is fed into the recording head 1. As a result, the signals are recorded on the magnetic tape with the optimum bias current fed into the recording head 1.

In the circuit shown in FIG. 3, the tape selecting switch 9 is changed depending on the kind of the magnetic tapes being used so that they receive the optimum bias current, by changing the voltage supplied to the bias oscillator and accordingly to change the bias current fed into the recording head 1.

In the circuit shown in FIG. 3, the number of the fixed contacts of the tape selecting switch 9 is two, whereby it is possible to use two kinds of the magnetic tapes different from each other and obtain the optimum bias current. However, by increasing the number of the fixed contacts, it is possible also to use more than three different kinds of magnetic tapes and provide optimum bias current.

Moreover, in the circuit shown in FIG. 3, a shunt circuit is provided which comprises the transistor 14, the resistor 15 and the shunt switch 16. The ON-OFF operation of the shunt switch 16 decides whether the voltage is applied to the bias oscillator 5 or not. Namely, the base of the transistor 14 is connected to the positive terminal 17 of the power supply through the shunt switch 16 and the resistor 15 at the ON-state of the shunt switch 16, so that the transistor 14 is put into the ON-state. At the ON-state of the transistor 14, the collector current flows through the resistor 13 and the transistor 14 to move the potential of the connection point C down and therefore the base of the control transistor 8 into nearly zero (ground potential). Consequently, the control transistor 8 becomes OFF-state and the voltage will not to be supplied the negative input terminal 6 of the bias oscillator 5.

When the shunt switch 16 is put into the OFF-state, the transistor 14 becomes OFF-state. Therefore, the collector current does not flow through the transistor 14 and so the potential of the connecting point C of the resistors 12 and 13 moves up. Consequently, since the control transistor 8 operates, the voltage corresponding to the base potential $Vb_1$ or $Vb_2$ is supplied to the bias oscillator 5.

In this way, the supply of the voltage to the bias oscillator 5 is switched on the ON-OFF operation of the shunt switch 16. The shunt switch 16 can rapidly control the supply of the voltage to the bias oscillator 5 in comparison with the conventional switch of this kind. Moreover, it can prevent the click noise which is apt to occur on the mechanical contact of the switch.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

For example, a power supply circuit according to the invention may be used to supply a power to any other circuit than the bias oscillator in the tape recorder.

What is claimed is:

1. Means for varying the bias signal to a magnetic head comprising, a variable gain bias oscillator connected to said magnetic head and having a gain control input terminal, a control transistor with one of its electrodes connected to said gain control terminal, a bias voltage source with one side connected to a second electrode of said control transistor, a first resistor connected between the third control electrode of said control transistor and the other side of said bias voltage source, a first switch and a second resistor connected in series and the combination connected in parallel with said first resistor and third and fourth resistors connected in series between said one side of said bias voltage source and said third control electrode of said control transistor.

2. Means for varying the bias signal to a magnetic head according to claim 1 including a second switch and a fifth resistor, a shunt transistor with its control electrode connectable to said one side of said bias voltage source through said switch and fifth resistor, a second electrode of said shunt transistor connected to said other side of said bias voltage source, and a third electrode of said shunt transistor connected to the junction point between said third and fourth resistors.

* * * * *